United States Patent
Kilgore et al.

(10) Patent No.: US 12,020,686 B2
(45) Date of Patent: Jun. 25, 2024

(54) SYSTEM PROVIDING EXPRESSIVE AND EMOTIVE TEXT-TO-SPEECH

(71) Applicant: D&M Holdings, Inc., Kanagawa (JP)

(72) Inventors: Robert M. Kilgore, Brooklyn, NY (US); Maria Astrinaki, Montreux (CH)

(73) Assignee: D&M HOLDINGS INC., Carlsbad, CA (US)

( * ) Notice: Subject to any disclaimer, the term of this patent is extended or adjusted under 35 U.S.C. 154(b) by 0 days.

(21) Appl. No.: 16/495,422

(22) PCT Filed: Mar. 23, 2018

(86) PCT No.: PCT/US2018/024033
§ 371 (c)(1),
(2) Date: Sep. 19, 2019

(87) PCT Pub. No.: WO2018/175892
PCT Pub. Date: Sep. 27, 2018

(65) Prior Publication Data
US 2020/0027440 A1     Jan. 23, 2020

Related U.S. Application Data

(60) Provisional application No. 62/475,296, filed on Mar. 23, 2017.

(51) Int. Cl.
*G10L 13/10*      (2013.01)
*G06F 3/01*       (2006.01)
(Continued)

(52) U.S. Cl.
CPC .............. *G10L 13/10* (2013.01); *G06F 3/017* (2013.01); *G06F 3/04883* (2013.01); *G10L 13/0335* (2013.01)

(58) Field of Classification Search
None
See application file for complete search history.

(56) References Cited

U.S. PATENT DOCUMENTS

| 5,899,975 A * | 5/1999 | Nielsen .................... G10L 13/00 704/270.1 |
| 7,693,716 B1 * | 4/2010 | Davis ...................... G10L 13/04 704/260 |

(Continued)

OTHER PUBLICATIONS

International Search Report and Written Opinion dated Jun. 25, 2018 for PCT/US18/24033.

*Primary Examiner* — Douglas Godbold
(74) *Attorney, Agent, or Firm* — Nieves IP Law Group, LLC; Peter A. Nieves

(57) ABSTRACT

A speech to text system includes a text and labels module receiving a text input and providing a text analysis and a label with a phonetic description of the text. A label buffer receives the label from the text and labels module. A parameter generation module accesses the label from the label buffer and generates a speech generation parameter. A parameter buffer receives the parameter from the parameter generation module. An audio generation module receives the text input, the label, and/or the parameter and generates a plurality of audio samples, A scheduler monitors and schedules the text and label module, the parameter generation module, and/or the audio generation module. The parameter generation module is further configured to initialize a voice identifier with a Voice Style Sheet (VSS) parameter, receive an input indicating a modification to the VSS parameter, and modify the VSS parameter according to the modification.

27 Claims, 13 Drawing Sheets

(51) Int. Cl.
*G06F 3/04883* (2022.01)
*G10L 13/033* (2013.01)

(56) References Cited

U.S. PATENT DOCUMENTS

| | | | | |
|---|---|---|---|---|
| 8,103,505 | B1 * | 1/2012 | Silverman | G10L 13/033 704/260 |
| 8,645,140 | B2 * | 2/2014 | Lobzakov | G10L 13/00 704/260 |
| 2004/0107101 | A1 * | 6/2004 | Eide | G10L 13/10 704/260 |
| 2005/0071163 | A1 | 3/2005 | Aaron et al. | |
| 2005/0096909 | A1 * | 5/2005 | Bakis | G10L 13/027 704/260 |
| 2006/0136215 | A1 * | 6/2006 | Kim | G10L 13/033 704/265 |
| 2006/0149558 | A1 | 7/2006 | Kahn et al. | |
| 2007/0260461 | A1 * | 11/2007 | Marple | G10L 13/10 704/260 |
| 2008/0140406 | A1 * | 6/2008 | Burazerovic | G10L 13/00 725/39 |
| 2008/0167875 | A1 * | 7/2008 | Bakis | G10L 13/08 704/258 |
| 2008/0270140 | A1 * | 10/2008 | Hertz | G10L 13/033 704/267 |
| 2009/0006096 | A1 | 1/2009 | Li et al. | |
| 2009/0306987 | A1 * | 12/2009 | Nakano | G10H 1/366 704/E13.011 |
| 2010/0042410 | A1 * | 2/2010 | Stephens, Jr. | G10L 13/10 704/260 |
| 2010/0066742 | A1 | 3/2010 | Qian et al. | |
| 2010/0318362 | A1 * | 12/2010 | Kurzweil | G10L 13/00 704/260 |
| 2011/0046957 | A1 * | 2/2011 | Hertz | G10L 13/06 704/266 |
| 2012/0031257 | A1 * | 2/2012 | Saino | G10H 5/005 84/622 |
| 2015/0081306 | A1 * | 3/2015 | Mori | G10L 13/033 704/260 |
| 2015/0243275 | A1 * | 8/2015 | Luan | G06F 3/0482 704/260 |
| 2016/0027431 | A1 * | 1/2016 | Kurzweil | G09B 5/062 715/203 |
| 2017/0169806 | A1 * | 6/2017 | Hamano | G10L 13/0335 |
| 2017/0186418 | A1 * | 6/2017 | Mairano | G10L 13/07 |
| 2022/0392430 | A1 * | 12/2022 | Kilgore | G10L 13/0335 |

* cited by examiner

```
CSS Example
.text {
    font-face: Arial;
    color: white;
    font-size: 48px;
    position: relative;
    top: 50%;
    left: 50%;
}
```

Hello

FIG. 7
(PRIOR ART)

SYSTEM PROVIDING EXPRESSIVE AND EMOTIVE TEXT-TO-SPEECH

CROSS-REFERENCE TO RELATED APPLICATIONS

This application claims the benefit of U.S. Provisional Patent Application Ser. No. 62/475,296, filed Mar. 23, 2018, entitled "System Providing Expressive and Emotive Text-to-Speech," which is incorporated by reference herein in its entirety.

FIELD OF THE INVENTION

The present invention relates to sound generation, and more particularly, is related to producing expressive speech from text.

BACKGROUND OF THE INVENTION

Various systems have been used to generate a synthesized audio voice rendering performance of a text string, for example, a sentence or phrase stored in a computer text file. The techniques used in these systems have been generally based upon statistical parametric speech synthesis (SPSS), typically using Hidden Markov Models (HMM), Deep Neural Networks (DNN), and/or Artificial Neural Networks (ANN).

FIG. 1 is a schematic diagram showing a prior art SPSS system 100. Broadly, the SPSS system 100 may be broken down in to two major components: a training part 101 that creates and maintains a library of acoustic speech features 150, and a synthesis part 102 that applies this library to a text input to produce a synthesized speech waveform.

Typical Statistical Parametric Speech Synthesis Systems may use HMMs, DNNs, and/or ANNs for training and synthesis parts respectively. The Speech Synthesis part may include but is not limited to the following modules: Conversion of text to phonetic descriptions module 110, Parameter Generation Algorithm module 120 (HMMs, DNNs, ANNs), Synthesis module 130 (HMMs, DNNs, ANNs), Model Interpolation module (not shown) (HMMs, DNNs, ANNs), Short-Term Parameter Generation Algorithm module (not shown) (HMMs, DNNs, ANNs), and Vocoding module 140 (offline, real-time or streaming).

During synthesis, SPSS systems compute a vector C of static and dynamic voice features via maximum likelihood parameter generation (MLPG) by maximizing over all available phonetic contexts provided by the phonetic labels of the input text.

SPSS streaming synthesis, for example Mage/pHTS, may be used to modify speech at three levels: phonetic context, parameter generation, and at the vocoder level. Phonetic context controls what is being said, parameter generation controls the parameters of the voice model such as prosody, speaking style and emotion, and the vocoder level control manipulates individual frames while the synthetic speech is being generated. Therefore, with SPSS streaming synthesis, it is possible to modify the speech before and while it is being generated. This was not possible with early implementations of SPSS where speech synthesis parameters were statically generated over the complete input sentence (input text). The introduction of streaming SPSS enabled speech synthesis parameters to be generated within a small sliding window that provides variable control of a movable portion of the complete input sentence as it is being rendered.

There are a few examples of alternative approaches that employ text markup to specific ranges of an input sentence to indicate emphasis, or changes in speed. Some more recent schemes have added detailed markup to alter rendering at the phoneme level, but these schemes only allow for duration and pitch control. Therefore, there is a need in the industry to address one or more of these deficiencies.

SUMMARY OF THE INVENTION

Embodiments of the present invention provide a system providing expressive and emotive text-to-speech. Briefly described, the present invention is directed to a speech to text system including a text and labels module that receives a text input and provides a text analysis and a label with a phonetic description of the text. A label buffer receives the label from the text and labels module. A parameter generation module accesses the label from the label buffer and generates a speech generation parameter. A parameter buffer receives the parameter from the parameter generation module. An audio generation module receives the text input, the label, and/or the parameter and generates a plurality of audio samples. A scheduler monitors and schedules the text and label module, the parameter generation module, and/or the audio generation module. The parameter generation module is further configured to initialize a voice identifier with a Voice Style Sheet (VSS) parameter, receive an input indicating a modification to the VSS parameter, and modify the VSS parameter according to the modification.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principals of the invention.

FIG. 7 shows an example of a prior art Cascading Style Sheet (CSS) string.

DETAILED DESCRIPTION

Figure 1:
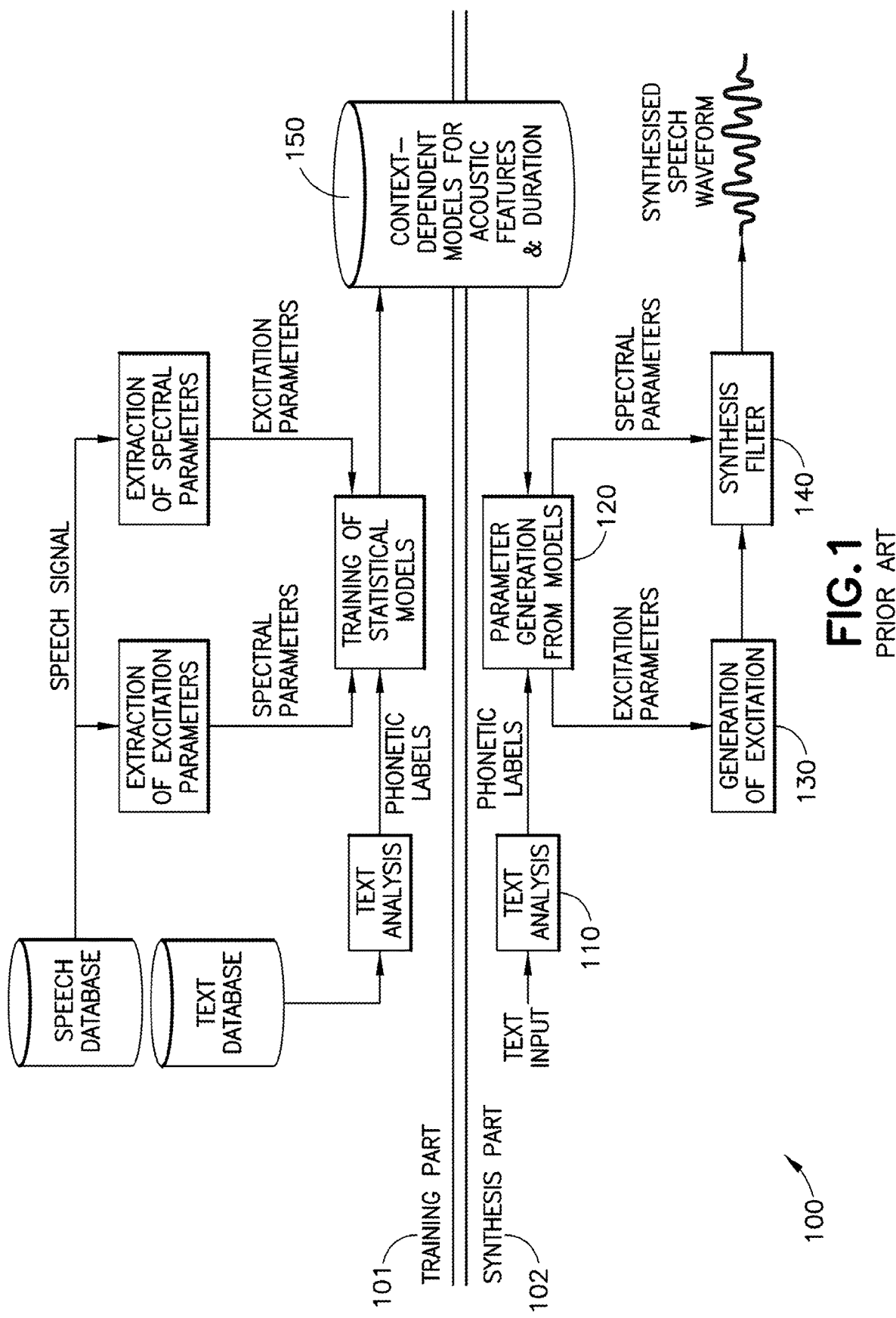
FIG. 1 is a schematic diagram showing a prior art SPSS system.

As used within this disclosure, "prosody" refers to an indicator of stress, meaning, emphasis, emotion, contrast, and/or focus in a spoken audio language phrase, for example using rhythm, intonation, inflection, intensity, duration, amplitude modulation, stressed sibilance, and other voice characteristics.

As used within this disclosure, a "rendering" refers to a text string and a plurality of voice parameters and/or features configured to be converted to an audio waveform, for example, via a plurality of audio samples. The conversion to audio may be performed, for example, by a voice synthesizer configured to receive the rendering and produce the audio samples and/or an audio waveform.

Reference will now be made in detail to embodiments of the present invention, examples of which are illustrated in the accompanying drawings. Wherever possible, the same reference numbers are used in the drawings and the description to refer to the same or like parts.

Existing SPSS systems described in the background section do not provide any facility for authoring graceful overlapping animation of multiple low-level voice parameters concurrently, or the manipulation and animation of anything other than predefined static text.

Embodiments of the present invention of a text-to-speech include a device, and system providing a statistical parametric voice synthesizer that enables independent control of several discreet elements of voice synthesis of waveforms that emulate human speech in real-time. The embodiments relate to a synthesizer that provides a statistical parametric text to speech engine that is capable of responding to real-time commands that control pitch, speed, vocal tract length, duration, speaking style, and other parameters. Further embodiments include a method for authoring and displaying "animation" control data specifically tailored to manipulate a suitably responsive real-time speech synthesizer.

Figure 2:
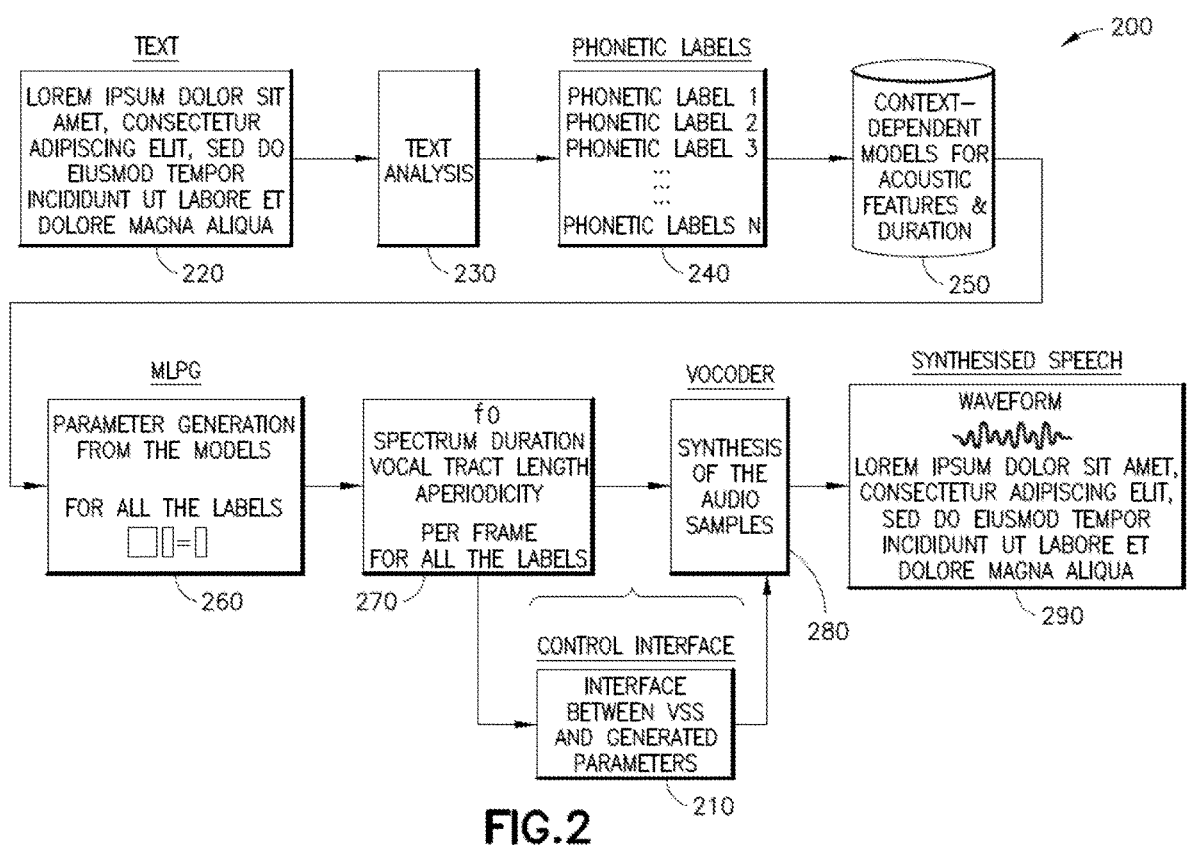
FIG. 2 is a schematic diagram showing an embodiment of an SPSS system with a control interface.

The embodiments represent the following improvement over previous SPSS implementations:

FIG. 2 shows an SPSS system 200 with an added control interface 210 for manipulating parameters in a text-to-speech (TTS) system.

Conversion of streaming text to labels, and

Figure 3:
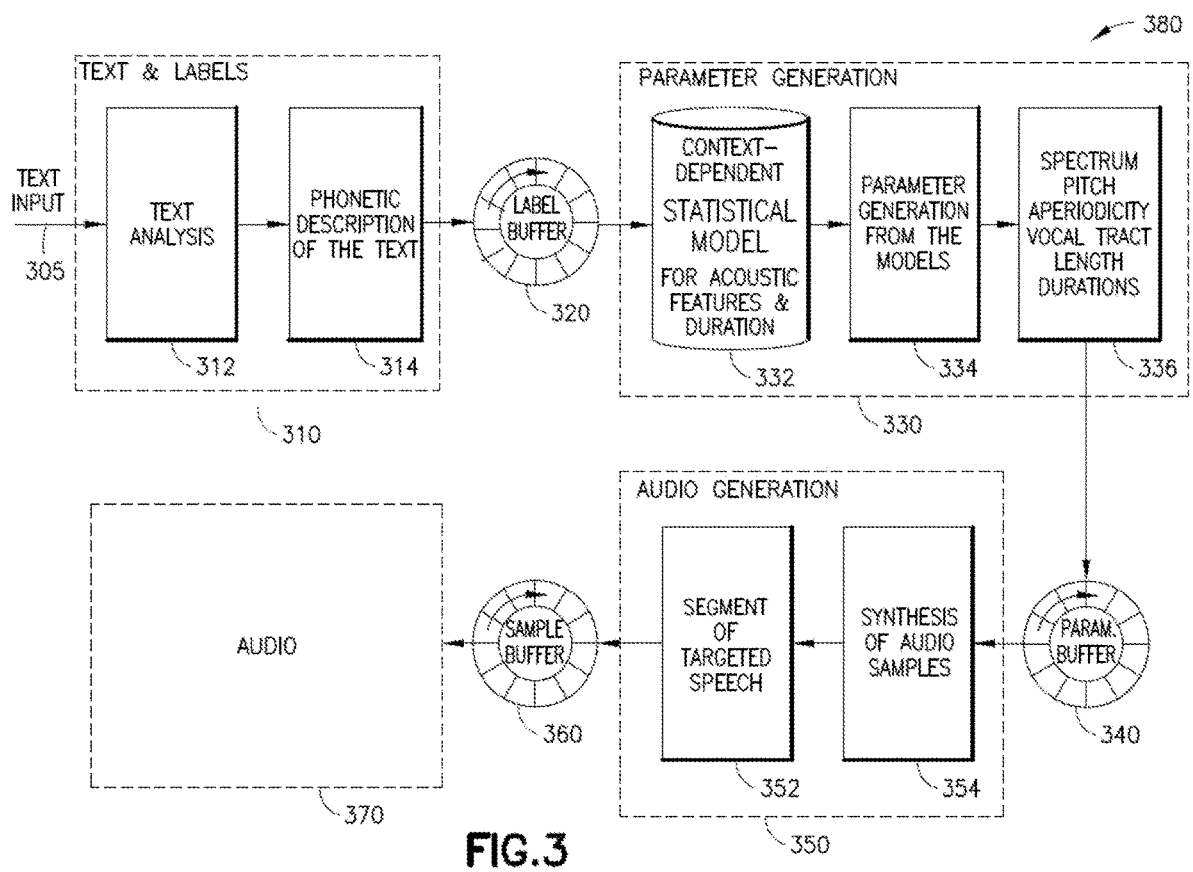
FIG. 3 is a schematic diagram showing an embodiment of a streaming SPSS system incorporating a scheduler.

FIG. 3 shows a scheduler 380 for streaming SPSS.

FIG. 2 shows an SPSS embodiment. A text string 220 undergoes text analysis 230, resulting in N phonetic labels lexically and phonetically describing the text string 240. This is used to access context dependent models for acoustic features and duration 250. An MLPG module 260 provides parameter generation from the models for all of the labels, translating the controls to VSS including, for example, pitch (f0), spectrum, duration, vocal tract length, and aperiodicity per frame for all the labels 270. The control interface 210 provides for real-time manipulation of these parameters. A vocoder 280 synthesizes a set of audio samples, which may be processed, for example, via a digital to analog converter to produce a synthesized speech waveform 290 that may be rendered by a rendering system such as an audio amplifier and an audio transducer (not shown).

The control interface 210 may include a graphical display, for example, a touch screen or another display that allows for manipulation of graphical and/or text objects using an input device, for example, a mouse, touchpad, keyboard, or track ball, among others. For example, the touch screen may detect a single touch gesture and/or multi-touch gesture and convert the gesture into a command to control a speech parameter.

In one embodiment of a text-to-speech (TTS) system, appropriately formatted VSS instructions are authored by a human animator. These VSS performance descriptions are ingested, parsed, and converted into an instruction set that manipulates the various parameters of a specialized TTS playback mechanism enabling it to respond expressively to proprietary control data that controls the rendering by an audio transducer in real-time as "animated TTS," giving the system the ability to "act" in ways that are far more subtle and detailed than traditional TTS systems which rely on algorithmically generated/simulated inflections that are not authored by a human animator, and/or are not algorithmically predicted and generated speech samples. This embodiment is analogous to an animated wireframe maquette, or preliminary model or sketch, used in visually animated computer graphic story telling for film and television. This system controls what can be thought of as a "voice maquette" or voice model that is a sonically malleable speech synthesizer controlled via specialized animation controls which are pre-authored by a human "animator" to deliver a performance of speech that enacts the dialog or scene in a suitable way to convey the emotional or semantic content at hand.

An example of a first aspect of the embodiment may be a commercially available piece of hardware capable of interpreting and rendering animated speech. An example of a second aspect of the embodiment may be a tool, for example an internal tool or an external application to help developers of speech systems author animated speech for rendering on the hardware of the first aspect. For example, the internal tool may be a framework/application used to craft the performance parameters of the voices while an external application may be a variation of the internal tool with a simplified GUI that allows the user to personalize certain characteristics of the voice of his device.

The several features of the TTS renderer may be controlled independently to deliver complex vocal performances. These controls may affect audible parameters such as the pitch, tempo, duration, and timbre of the voice. Each of these parameters may be addressable on a sub-phoneme level explicitly bound to a particular phrase or piece of dialog. Additionally, this speech synthesizer can bind envelope controls to a range of appropriately tagged dynamic content, or higher-order elements of speech such as grammatical structures. In addition to a library of known phrases that have been prepared with human authored animations or performances, the system under the first embodiment may encountering a phrase that has not been rendered before but contains a grammatical feature the system has previously stored as an animation.

An example of such a previously stored animation is a greeting. A host application may have an affordance whereby the user can teach the system their name. When the system hosting the host application greets the user by name, it may have a series of pre-animated contours to play back for greetings of various syllable counts. For example, "Hi Dave" vs "Hi Sebastian". Even though no explicit animation exists for the name Sebastian, the system may map animations across phrases elements that are of unpredictable length but can be recognized as belonging to a class of utterances that the system may encounter. In another example: An animation could be authored to handle "contrastive" sentences. "I can't do X, but what I CAN DO is Y." Here again, the system could have animations that are bound to structural elements and not simply tied to pre-scripted text strings.

Some previous systems use a text markup scheme similar to HTML to impose "expressivity" onto computer generated speech, where words or parts of a phrase may be surrounded with tags that tell the TTS engine to adjust the rendering of speech in some particular way, for example, raising the pitch or adjusting the volume. But this markup is rarely at the phoneme level, and those systems which do allow this level of detail do not allow for independent control over amplitude, vocal tract length, duration, etc. Additionally, those systems that do offer some limited set of phoneme controls do not enable the injection of "wildcard" words or phrases into the animation control stream. An advantage of the present embodiment is that animation envelopes (see FIG. 9) may be applied to explicit text or more abstract features of language like certain types of grammatical construction or sentence graphs. Some control data may be bound to explicit text, while other data may only apply to more high-level abstract aspects of the content if they are present, such as parts of speech, grammatical structures, or even physical aspects of the content like 'the last three words of the sentence.'

The present embodiment may be viewed as text to voice generation somewhat analogous to computer graphic animation. Computer graphic animation capability has grown in sophistication over time and now appears in a wide variety of popular entertainment forms. Feature length movies solely populated by computer generated actors were unthinkable 30 years ago. Currently computer animation appears in some form in almost every film made today.

A given text sentence may be converted into a collection of frames that are provided to a vocoder to convert into speech/sound. The control interface 210 for the vocoder relies significantly on trajectories, which include duration, fundamental frequency and spectral coefficients. Depending on the vocoder chosen for analysis and synthesis other feature trajectories and parameters may be present, such as aperiodicity and frequency warping. A parameter trajectory may be sequential, such that the present control parameter for a present frame, for example, a frame at time t, the interface relies on the parameter trajectories generated for the previous frame, for example at time t−1. A simple trajectory, for example, a trajectory under 0.1 sec would pass undetectable for the user, or a trajectory depending upon, for example, 20 future frames of about 5 ms/frame may only rely on the previous frame, while more complex trajectories may rely on the previous two or more frames, providing continuity to an utterance. The generation of a trajectory may also rely on future frames.

Generating the parameter trajectories involves generating information for every frame, including, but not limited to: fundamental frequency, spectrum and aperiodicity. In particular, in order to describe each frame, one value may be used for each of a fundamental frequency ($f_0$ value in Herz for voiced frames/0 for unvoiced frames), a vector of spectrum coefficients, for example, 60 spectrum coefficients, and a vector of aperiodicity coefficients, for example 5 aperiodicity coefficients, as described further below. For a specific vocoder, in order to define a frame one fundamental frequency value, X spectral coefficients and Y aperiodicity coefficients may be needed, but values X and Y may differ depending on the sampling frequency of the data. The higher the sampling frequency, the higher the number of coefficients. In case of another vocoder, for example MLSA vocoder, use of one fundamental frequency value, 35 cepstral coefficients and no aperiodicity coefficients may suffice.

According to one embodiment, the system may generate 3 files, one for each trajectory (fundamental frequency, spectrum and aperiodicity). The fundamental frequency trajectory contains 1×N values where N is the number of frames predicted for the input text. The spectrum trajectory contains M×N values where M is the order of the coefficients used while N is the number of frames predicted for the input text, and the aperiodicity trajectory contains M×N values where M is the order of the aperiodicity coefficients while N is the number of frames predicted for the input text. Please note that the values of 60 and 5 for the spectrum and aperiodicity respectively may vary. For example, the values for the spectrum and aperiodicity may depend on the analysis window which, in turn, may depend on the sampling frequency of the data. If the training data are sampled at 16 KHz it may be desirable to use an FFT analysis window of 512 samples rather than one of 2048 samples that may be preferable for data sampled at 48 KHz. Then depending on the sampling rate of the data and the granularity the values may increase or decrease. For example, for the WORLD vocoder, default parameters for a sampling rate of 48 KHz are 60 and 5 for the spectrum and aperiodicity respectively.

The control interface 210 provides a graphical user interface (GUI) to the user where the generated parameters may be represented as trajectories, for example, a GUI that reads these three parameter trajectory files and present them graphically, for example, in two dimensional graphs. In an exemplary two dimensional graph shown by FIG. 9, the y-axis represents the value read and the x-axis indicates the fame count.

In addition to trajectories of the three parameters, the GUI may numerically and/or graphically represent parameters such as time elapsed and relative speed of delivery of the rendered utterance, as well as other parameters of the vocoder, such as vocal track length. The GUI allows trajectories to be accessed and/or modified, for example, by changing the values on the x-axis and/or y-axis or of the graphs, or by other means, for example, using pop-up menus, text boxes, or other graphical interface tools. The modifications by the user are then used to regenerate the parameter trajectories so that they reflect the intention of the user on the controller based on the modification.

The embodiments may also translate a Cascading Style Sheets (CSS) type structure into one or more trajectories. The present embodiment is analogous to a CSS and is called a Voice Style Sheet (VSS). VSS is applied to speech processing, in order to create/apply stylistic controls over the generated speech parameters and therefore affecting the final speech output. The controls present in a VSS file may be translated into frames, or any other unit where the controls may be applied, for example, a word, phrase, or sentence, and applied on existing trajectories. In general, the controls are applied to frames even if the control level is directed to a higher level abstraction, for example, controls applied to a whole phrase are translated into and implemented upon frames.

In a similar manner, the controls that are manually input by a user in the GUI may be translated for storage in a VSS file and saved for future use. Unlike previous text-to-voice system, the control interface 210 for the present embodiment allows the user to:

Correct the pitch generated by the system

Correct the duration of silences and pauses generated by the system

Fine tune prosody for appropriate system responses

Modify prosody in order to have questions, exclamations, etc., and

Modify the overall personality of the voice.

The vocal markup tool provides for graphical manipulation of parameters used for preparing an input text string for rendering by a speech synthesizer. In particular, the vocal markup tool adds symbols and text to the text string to provide rendering instructions to the speech synthesizer. The markup symbols may generally indicate a value or range one or more vocal parameters, such as pitch, duration, amplitude, vocal tract (e.g., size of voice box, length of the vocal tract, etc.), sibilance, prosody width (the amount of pitch inflection applied to speech), and silences (time gaps between audible utterances). The markup tool may also be used to probabilistically determine the occurrence or value of a parameter being utilized. This may be used to prevent repeated utterances from sounding identical. For example, the timing of a breath in a phrase, or the exact pitch used for a specific word or phrase may be affected by a degree of randomness applied to a specific parameter. The user may specify a degree of randomness applied to a given speech parameter, for example, in one of two ways: (1) by specifying a high and low range for the parameter's value, or (2) by specifying the probability that the parameter adjustment will be applied during the current rendering. At rendering time, the VSS is evaluated, and any randomized parameters are rendered accordingly.

While the markup language uses text and/or symbols to indicate each of these parameters in relation to a textual word (or a portion of a textual word), the markup tool presents the parameters graphically so the user (voice animator) may visually interpret the parameter, and to manipulate the parameter, for example, using a mouse or track pad.

For example, a pitch block may represent the pitch of the voice to be rendered via a graph of frequency (x) vs. time (y), such that the height a line representing the pitch corresponds to a change in pitch (frequency). The pitch line may include one or more handles or markers, for example, a black dot on the pitch line, that may be manipulated to change the pitch. The user may insert additional handles on the pitch line to change the time granularity control of the pitch. Other tools may be used to manipulate the pitch, such as curve generators (to ensure smooth pitch transitions) or a granular step tool, to ensure that the pitch snaps according to specific allowed values.

Similarly, durations of a desired parameter may be controlled by size and placement of a graphical marker along the time (y) axis.

Various graphical tools may be assigned to a particular parameter destination. Such graphical tools may be configured to enhance a trajectory generated by the system (enhance mode), or a modulator may be configured to replace a trajectory generated by the system. Destinations controlled by a graphical tool may include, but are not limited to pitch, duration, amplitude, vocal tract, sibilance, prosody width, and silences.

An envelope is a graphical tool that modulates sound over in a series of time segments. A typical envelope may have three time segments: attack, sustain, and decay. More complex envelopes may break up each of these time segments into two or more sub-segments. When a sound producing source (an oscillator) produces sound, the loudness and spectral content of the sound change over time in ways that vary from sound to sound. The attack and decay times of a sound have a great effect on the sonic character of that sound. Sound synthesis techniques often employ an envelope generator that controls a sound parameter at any point in its duration. Most often this envelope may be applied to overall amplitude control, filter frequency, etc. The envelope may be a discrete circuit or module or may be implemented in software.

FIG. 3 depicts a scheduler module 380 that monitors and registers the activities of a text and label module 310, a parameter generation module 330, and an audio generation module 350. The scheduler module 380 is described in further detail below.

Figure 4:
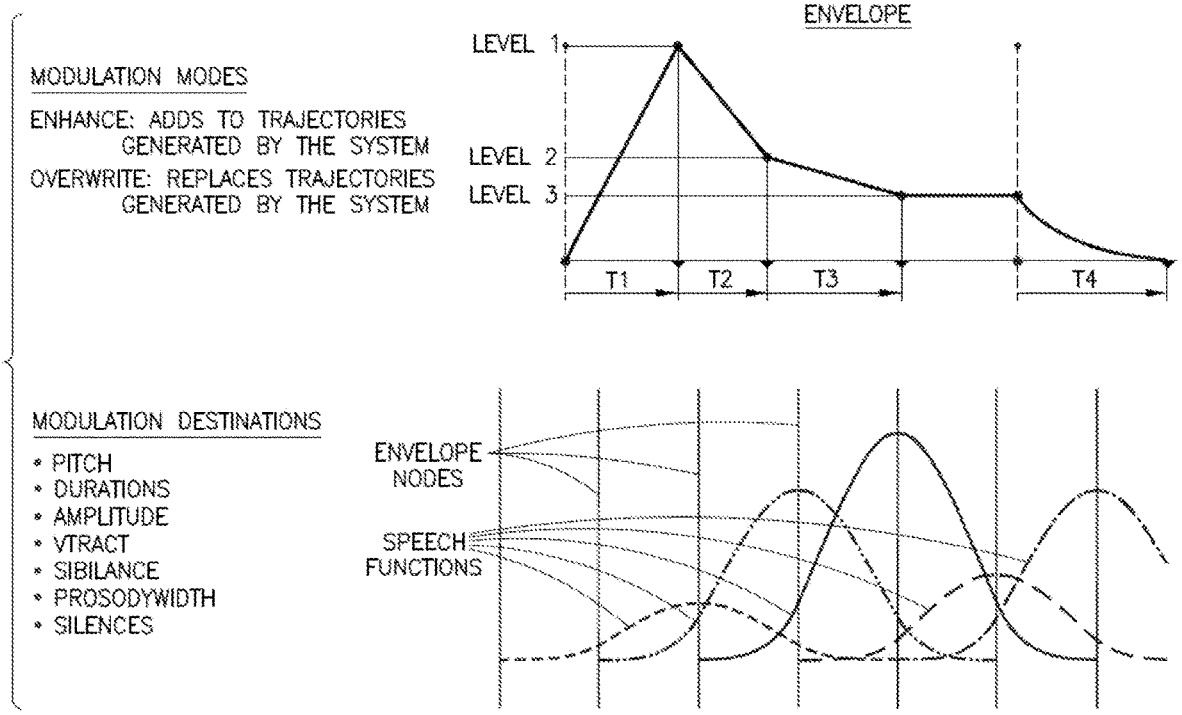
FIG. 4 is a graph showing envelope nodes and modulation destinations.

FIG. 4 is a plot diagram of envelope nodes and speech functions showing how four separate CSS-like files act on a single utterance. In this example, each envelope applies to a specific parameter of the speech to be generated. This yields overlapping animation of speech parameters acting on a single utterance.

The animation of a text stream may include one or more envelopes that modulate the value of one or more speech parameters. Envelopes are placed at specific locations within a phrase by means of an origin of the envelope FIG. 9. The placement of the origin may be specified in one of several ways. For example, a specific phoneme may be used to anchor the origin of a VSS envelope, such that the occurrence of the identified phoneme results in the placement of the origin point of an envelope targeting a specific speech parameter. Similarly, a word may be used to set the origin of a modulator at a particular location in a sentence, for example at the third word of the sentence.

Figure 8:
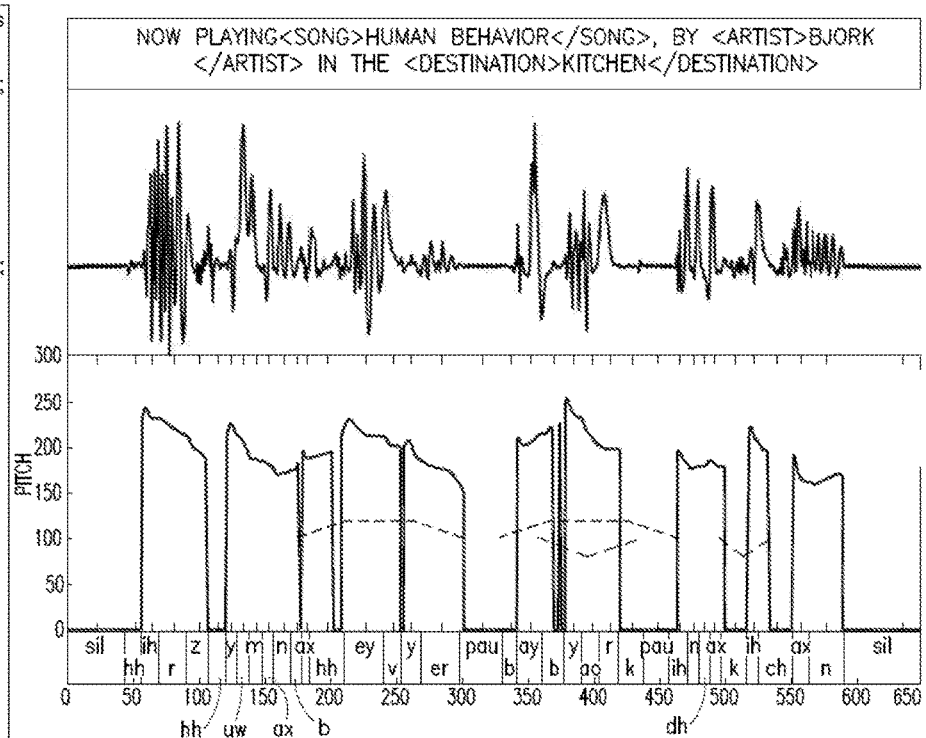
FIG. 8 shows an example of a VSS string.

FIG. 7 shows an example of a prior art CSS string that denote the look and placement of text. In contrast, FIG. 8 shows a VSS string, which provides envelope control over various speech parameters used for rendering the expressive TTS.

Combining streaming SPSS with ANNs may provide the following benefits:

Leveraging ANN output quality & streaming controllability,

Starting system response instantly & streaming it to the user while still rendering an output, Altering the response to the user on the fly, for example, cutting the rendering short or adding further information after rendering speech has already begin, Minimize system latencies, Reducing the computational system load by computing & optimizing smaller parameter sets, and Changing the speaking style while the system is responding.

The scheduler provides precise control over the speech rendering parameters delivered to the vocoder. The schedule assures certainty on the correct interpretation and application of the VSS on the parameters. Timestamped data provides information on where and when which controls are appropriately applied. For example, the position (timing) of a simulated breath in the context of a spoken phrase may affect the delivery of subsequent portions of the text. Further, the scheduler makes it possible to regenerate data with a given control set or VSS.

Given a control set VSS but without the use of a scheduler, the controls may be applied on the phrase/word/frame, and eventually samples at random times in a multithreaded architecture. Therefore, for a given text phrase and a given VSS control set every synthesis iteration may result in slightly different rendering of speech samples. The difference in time may vary due the workload of the generation threads, the protected/mutexed areas as well as the overall processing load of the system/device running the synthesizer.

On the other hand, given a control set VSS and a scheduler, the controls may generally be applied every time to the same segment of speech in a deterministic fashion, and therefore for a given text phrase and a given VSS control set every synthesis iteration will result in exactly the same speech samples. In general, use of timestamps by the scheduler ensures that the VSS controls are applied to the phrase/word/frame in the exact time that this segment is being processed, without being affected by any processing load of the threads or the system.

An example fragment of VSS is typically formatted as follows:

```
.pitch_example {
    speech_parameter: pitch;
    origin: 2wd;
    width: 50fr 75fr;
    amplitude: 140%;
    sustain: 60fr;
}
```

Figure 9:
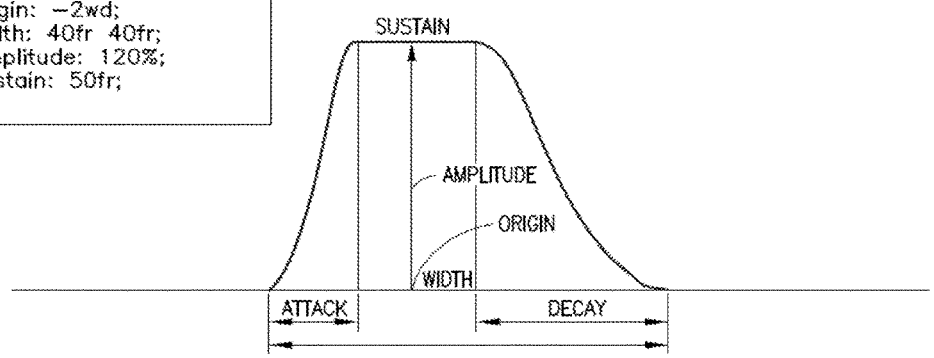
FIG. 9 shows an example of the speech parameter pitch.

FIG. 9 shows an example of an envelope applied to the speech parameter pitch In general, speech parameters may be modulated by specifying envelopes. VSS envelopes have an origin which is the point that fixes the peak of the envelope for a given trajectory. The origin is the point from which the curve of the envelope is calculated. The origin of an envelope can be placed using any one of several reference markers within the phrase.

For a word, the origin may be placed on a stable part of the stressed phoneme of a given word. Reference to the word may be indexed by a word count, for example, the first word in the sentence may written as "origin: 1wd;". Note that the word indexing may also be applied backward from the end of the sentence. "origin: −2wd:" would put the origin on the stable part of the stressed phoneme of the second to last word in the phrase or sentence.

For a frame, the origin may be placed at an explicit frame within the phrase or sentence. This may be written, for example, as "origin: 110fr;"

For a percentage, the origin may be placed at an arbitrary percentage of the way through the phrase or sentence. In this way, "origin: 25%;" would center the original ¼ of the way through the entire sentence. Note leading and trailing silences may not be included in the total percentage of the phrase but pauses in the sentence may be included.

For a phoneme ID, the animator may target a specific phoneme in a sentence using the origin. The pitch of any phoneme can be adjusted by setting the width using the origin statement. For example, using the origin: "origin: 1aa;" first occurrence of phoneme "aa" would be targeted while by using the origin: "origin: −1aa;" the last occurrence of phoneme "aa" in the test sentence would be targeted. A wildcard indicator, such as "origin: *aa;" targets all occurrences of the phoneme "aa".

Figure 10A:
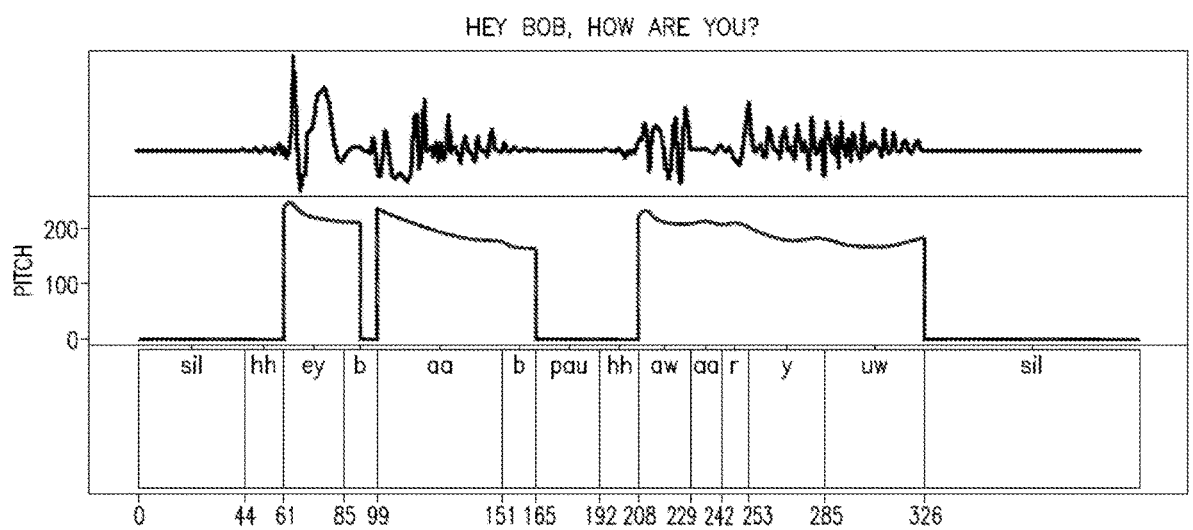
FIG. 10A is a graph showing the phonemes present in a test sentence.

FIG. 10A, shows the phonemes present in the test sentence "Hey Bob, how are you?" In order to alter the pitch of phoneme "ey" in the first word of the sentence (Hey), the statement. "origin: 1ey;" may be used to center the origin in the middle of the stable state of the given phoneme.

The purpose of this control is apparent when applied to voiced parts of the speech, meaning the parts that have non-zero value as pitch. It may also be applied on unvoiced parts of the sentence, such as consonants, pauses and silences, however there may be no audible result there.

The phonemes used in examples herein are from the English language, represented in ASCII. However, in addition, foreign phonemes may also be used to better pronounce foreign words in a more natural and understandable way.

The controls may be applied to the phonetic level of text to achieve improved granularity of the sculpting. The control sets are expandable to refer to linguistics features as well, enabling the animator to target specific words in the text and/or punctuation like commas, exclamation marks, full stops, etc.

The width describes a duration or temporal effect of a particular curve, indicating, for example an amount of time to reach full effect and how quickly it decays back to the original level. Both the attack and decay may share the same value, for example, if the width attribute is followed by a single value, then the attack and decay time are equal. If on the other hand, two values are specified, the first value may indicate the attack time (duration) and the second value may indicate the decay time. The format may be presented as:

Valid Parameters—[word|frame|percentage]
for example:
width: 1wd;
width: 35fr 10fr;
width: 30%;

The amplitude of the curve will scale the pitch by percentage only. For example, a pitch amplitude of 100% has no effect on the pitch, while a pitch amplitude of 50% lowers the pitch by an octave, and a pitch amplitude 200% raises the pitch by an octave.

The sustain parameter controls the duration of time the curve holds at its peak amplitude. Regardless of the length of the sustain parameter, the width/attack/decay values stay the same, as shown in FIG. 9.

Voice identity may be used to differentiate individuals and includes voice traits that may modify the voice model as a whole and result in producing a final voice attributable to a distinctly identifiable person By accessing and modifying the parameters that control voice identity traits, the user/customer may create a personalized voice for a specific system Such traits may include, for example, the vocal tract length, the lower and upper limit of pitch, the overall duration and the overall pause duration. Voice identity parameters include, for example, vocal tract length, pitch range, overall duration, and overall pause duration.

Raising the value of the vocal tract length parameter corresponds to increasing the length of the vocal tract of the speaker. A longer vocal tract results in a deeper sounding voice. Similarly, lowering the vocal tract length parameter corresponds to decreasing the vocal tract length of the speaker. This results in a higher pitched voice, for example, more like a cartoon character voice In combination with the actual gender of the voice model, this may result in having a female voice model that sounds more male and vice versa.

By altering the general lower and upper limit of the voice pitch parameters, the generated pitch contours may be scaled within these limits. This results in changing the fundamental frequency of the voice and thus a part of its identity. The same voice can sound generally higher, lower or broader and thus change the perceived personality of the voice. This control may also be paired with the vocal tract length control for more realistic results.

The overall duration parameter controls the amount of time between the beginning and ending of an uttered phrase Increasing the overall duration of the generated voice produces an effect of a more explanatory and calm voice, while decreasing the overall duration produces the effect of the speaker having a more active and energetic voice character.

The overall duration parameter controls the amount of time between text components of a rendered phrase, for example, the time between words and/or the time between sentences or phrase portions. By manipulating the duration of all the generated pauses in the speech, both alone and in combination with the control of the overall duration, the voice is able to project a distinguishable and identifiable speaking style.

The above described parameters may be applied to a text phrase, for example, by parsing VSS. For example, a collection of VSS may include:

```
// comment
.pitch_song{
    speech_parameter: pitch;
    origin: 50%;
    width: 0fr 75fr;
    amplitude: 120%;
    sustain: 5fr;
}
// comment
.destination{
    speech_parameter: duration;
    origin: 220fr;
    width: 50fr;
    amplitude: 90%;
    sustain: 20%;
}
// comment
.artist{
    speech_parameter: pitch;
    origin: −2pau;
    width: 50fr 75fr;
    amplitude: 140%;
    sustain: 60fr;
}
```

As the format of the VSS is well structured, a VSS file may be parsed by use of regular expressions to retrieve all the provided information. An example of text is:

Text: Now playing, $SONG, by $ARTIST in the $DESTINATION.

An example of text with descriptors is:

Now playing, <song> $SONG </song>, by <artist> $ARTIST </artist> in the <destination> $DESTINATION </destination>.

By incorporating the descriptors into the generated text, information about where to apply a particular control may be extracted by using regular expressions.

The given text may subsequently be converted into phonetic labels for parsing. The phonetic labels may be structured using specific linguistic features. For example:

StartTime EndTime PreviousPhoneme-CurrentPhoneme-NextPhoneme

As these phonetic labels have a very specific format, regular expressions may be used to parse them and retrieve necessary information to successfully apply the VSS controls. Information extracted from the labels include but is not limited to:

Obtaining a starting time;
Obtaining an ending time,
Setting the position of a phoneme in the phrase;
Identifying a current phoneme;
Determining whether a given phoneme is a vowel; and
Determining a stable state of a phoneme.

Figure 6:
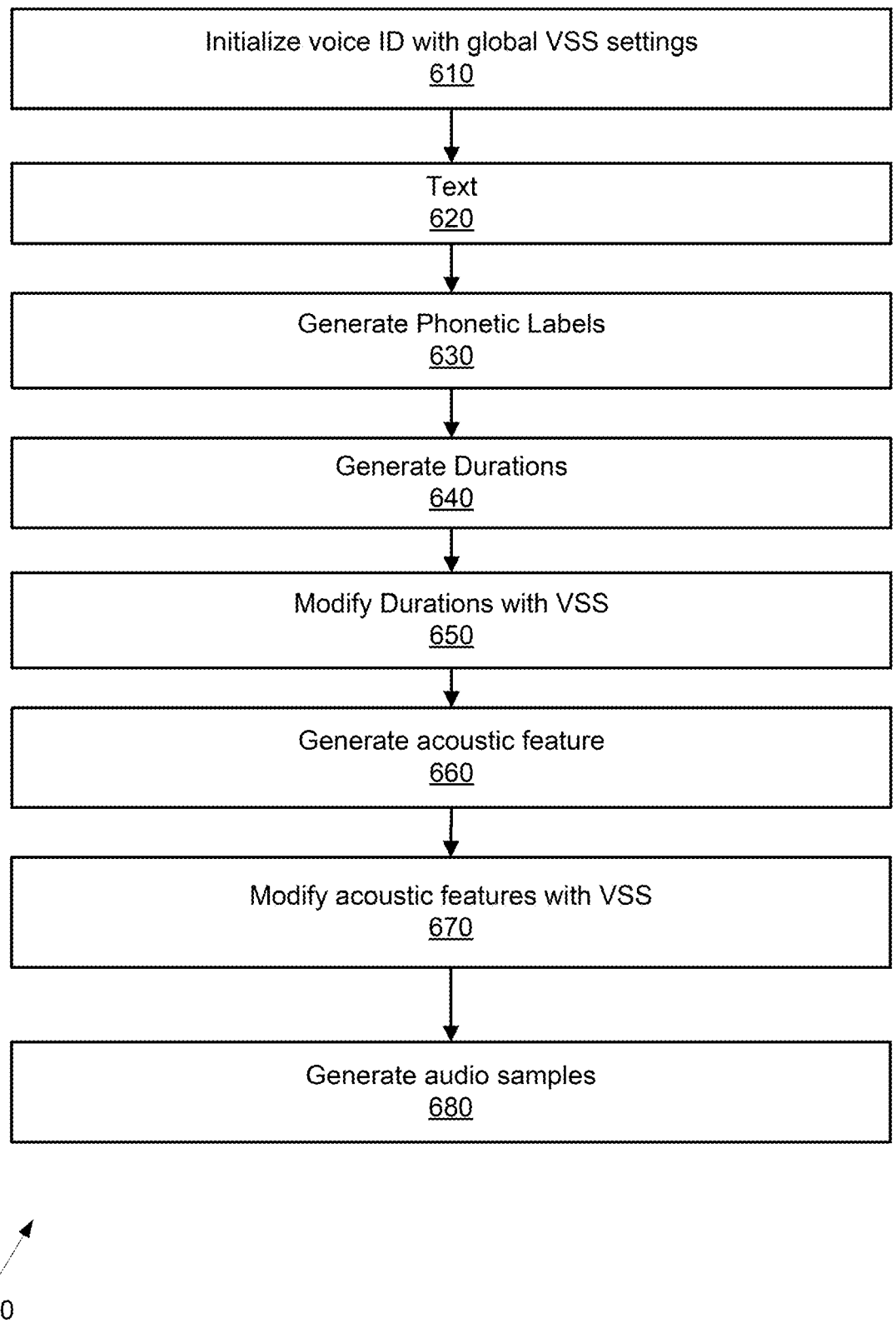
FIG. 6 is a flowchart showing an exemplary embodiment of a method for executing functionality of the present invention

FIG. 6 is a flowchart 600 for an exemplary embodiment of a method for executing functionality of the present invention. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

FIG. 6 is described using the embodiment of a text-to-speech scheduler 380 shown in FIG. 3. A voice ID is initialized with global VSS settings, as shown by block 610. A text and labels module 310 receives text 305 as input, as shown by block 620. The text and labels module analyzes the text 312 and generates phonetic labels describing the text 314, as shown by block 630. The text and labels module 310 stores the labels in a label buffer 320, for example, a circular buffer. A parameter generator module 330 accesses the label buffer 320 and generates duration parameters, as shown by block 640, among other possible parameters. The parameter generation module may include, for example, a context-dependent statistical model 332 for acoustic features and duration which is referenced for generation of parameters 334. The parameter generation module 330 may include a subsystem for controlling spectrum pitch aperiodicity and vocal tract length durations 336. For example, a control interface 210 (FIG. 2) may interface with the parameter generation module 330 to display generated parameters and to provide an interface allowing for manipulation of the generated parameters in real time, for example, modifying durations with VSS, as shown by block 650, and generating acoustic features as shown by block 660 and modifying acoustic features as shown by block 670. The parameter generator module 330 stores the parameters in a parameter buffer 340, for example, a circular buffer.

An audio generation module 350 receives the parameters from the parameter buffer 340 and synthesizes audio samples based on the received text and the parameters, as shown by block 680. The audio samples may be grouped into segments, for example, according to sections of the received text, and stored in a sample buffer 360. An audio module 370 accesses the samples from the sample buffer 360 and renders audio. For example, the audio module 370 may include a digital-to-analog converter (DAC), an audio amplifier, and an audio transducer, such as a speaker.

While the embodiment shown in FIG. 6 indicates modification of duration and pitch, similar methodology may be applied to vocal tract length, voice identity parameters, and text descriptors.

The VSS for voice identity may be implemented at the initialization of the system and thus may be considered as global settings of the voice. Any further VSS may be applied on top of these voice identity modifications.

The VSS for duration may be applied just after generating the durations from voice models, while acoustic related parameters such as pitch and vocal tract length VSS, but not limited to pitch and vocal tract length VSS may be applied just after generating acoustic features and just before vocoding (conversion into sound samples).

It is important to note here that the sequence of VSS application generally does matter, and commutative properties may not apply between pitch and durations. For example, the audible result may be different if a vowel duration is stretched before changing its pitch, rather than the pitch being altered before stretching the vowel duration. Although any number of VSS fragments with any possible style sequences may be supported, the approach used in the first embodiment is to first compute and apply the VSS to the durations, and then apply the VSS to the pitch. The reason for this is that once the durations are correctly set in place then the pitch controls are typically easier and more meaningful. Additionally, applying VSS to duration before pitch enables efficient support streaming architecture though intermediate generation steps, from label generation to final audio samples.

The graphical interface of the control interface 210 provides the animator with visual feedback as well as audible feedback from the controls described and applied in the VSS. This interface may depict, for example, the result of the VSS on the pitch trajectory (pitch controls) and the number of samples (duration controls).

FIG. 10A shows the output of the graphical interface of the control interface 210 when no VSS is applied. On the very top, the synthesized text was "Hey Bob, how are you?" The generated waveform and the pitch curve respectively appear just underneath. Lastly, FIG. 10A indicates the phonemes and their duration in frames. This helps the animator to decide which controls to apply where depending on the sculpting he/she is targeting.

Figure 10B:
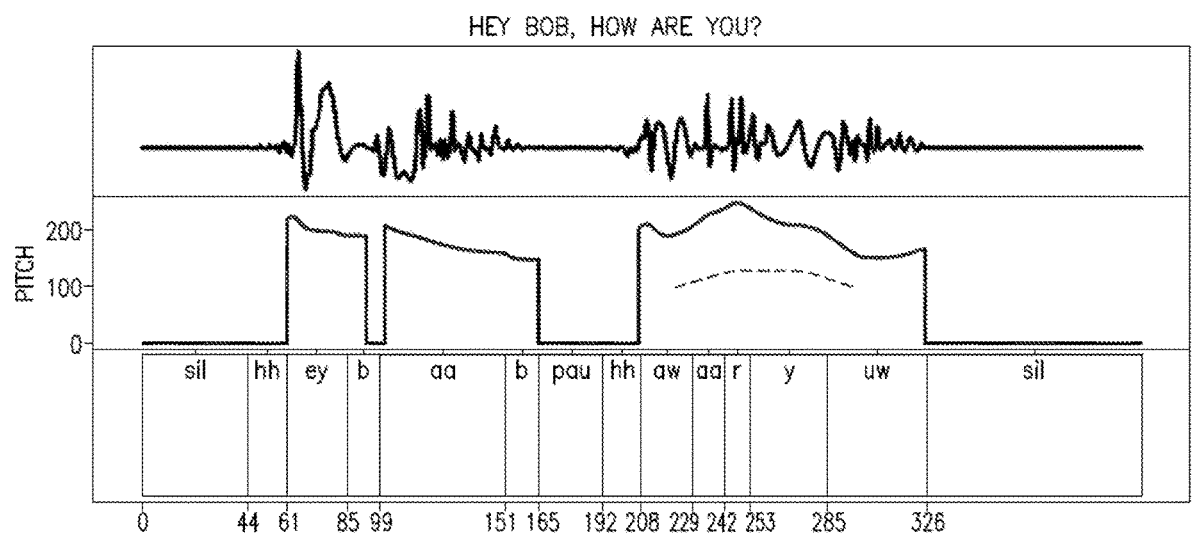
FIG. 10B is a graph that shows the output of graphical interface module when VSS pitch controls are applied to the text sentence of FIG. 10A.

FIG. 10B shows the output of the graphical interface of the control interface 210 when VSS that only contains pitch controls is applied. The effect that these controls have on the pitch curve is apparent when compared with the pitch curve in FIG. 10A. A dotted line represents the curve used to alter the generated pitch and have a new sculpted pitch trajectory.

Figure 10C:
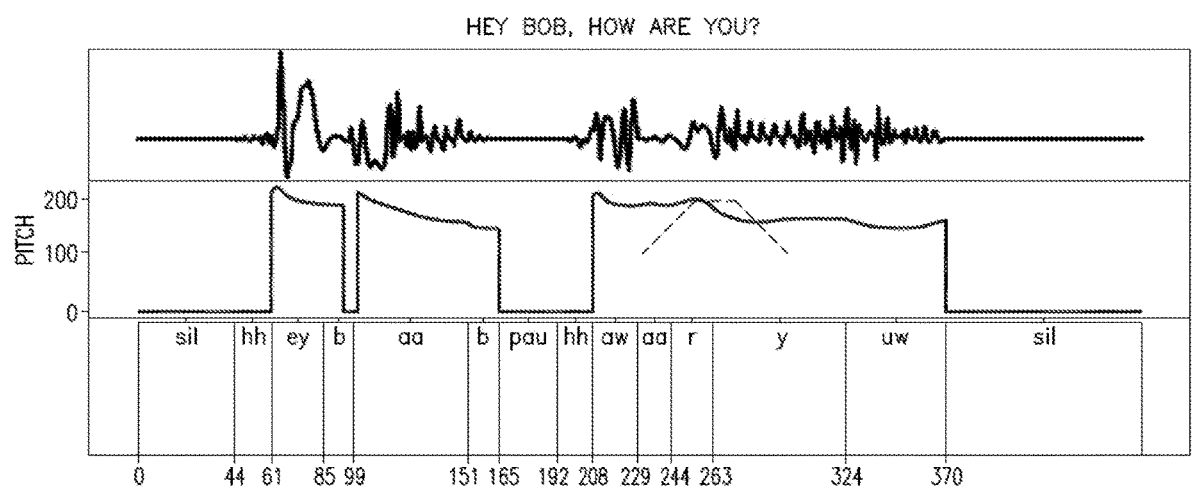
FIG. 10C is a graph showing the output of graphical interface module when VSS duration controls is applied to the text sentence of FIG. 10A.

FIG. 10C shows the output of the graphical interface of the control interface 210 when VSS that only contains duration controls is applied. The effect that these controls have on the number of samples generated (duration) may be seen when compared with the pitch curve in FIG. 10A. A dotted line represents the curve used to alter the generated durations (number of samples) resulting in a new sculpted duration trajectory.

Figure 10D:
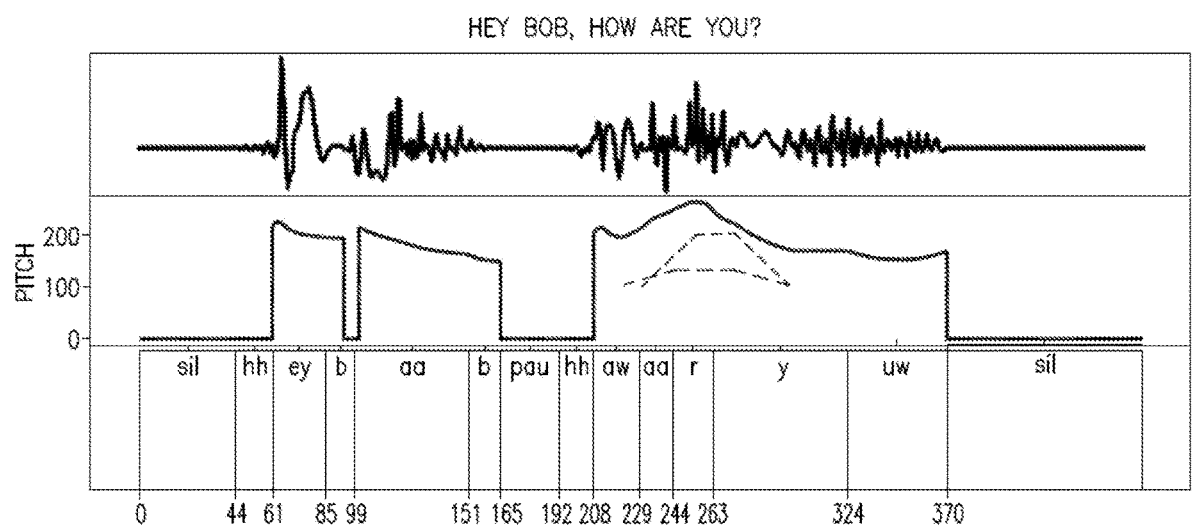
FIG. 10D shows the output of graphical interface module when VSS controls for both duration and pitch are applied to the text sentence of FIG. 10A.

FIG. 10D shows the output of the graphical interface of the control interface 210 when VSS that contains both duration and pitch controls is applied. The effect that these controls have on both the number of samples generated (duration) and the pitch trajectory may be seen when compared with the one in FIG. 10A. Dotted lines represent the curves used to alter the generated durations (number of samples) and pitch indicating new sculpted duration and pitch trajectories.

Figure 5:
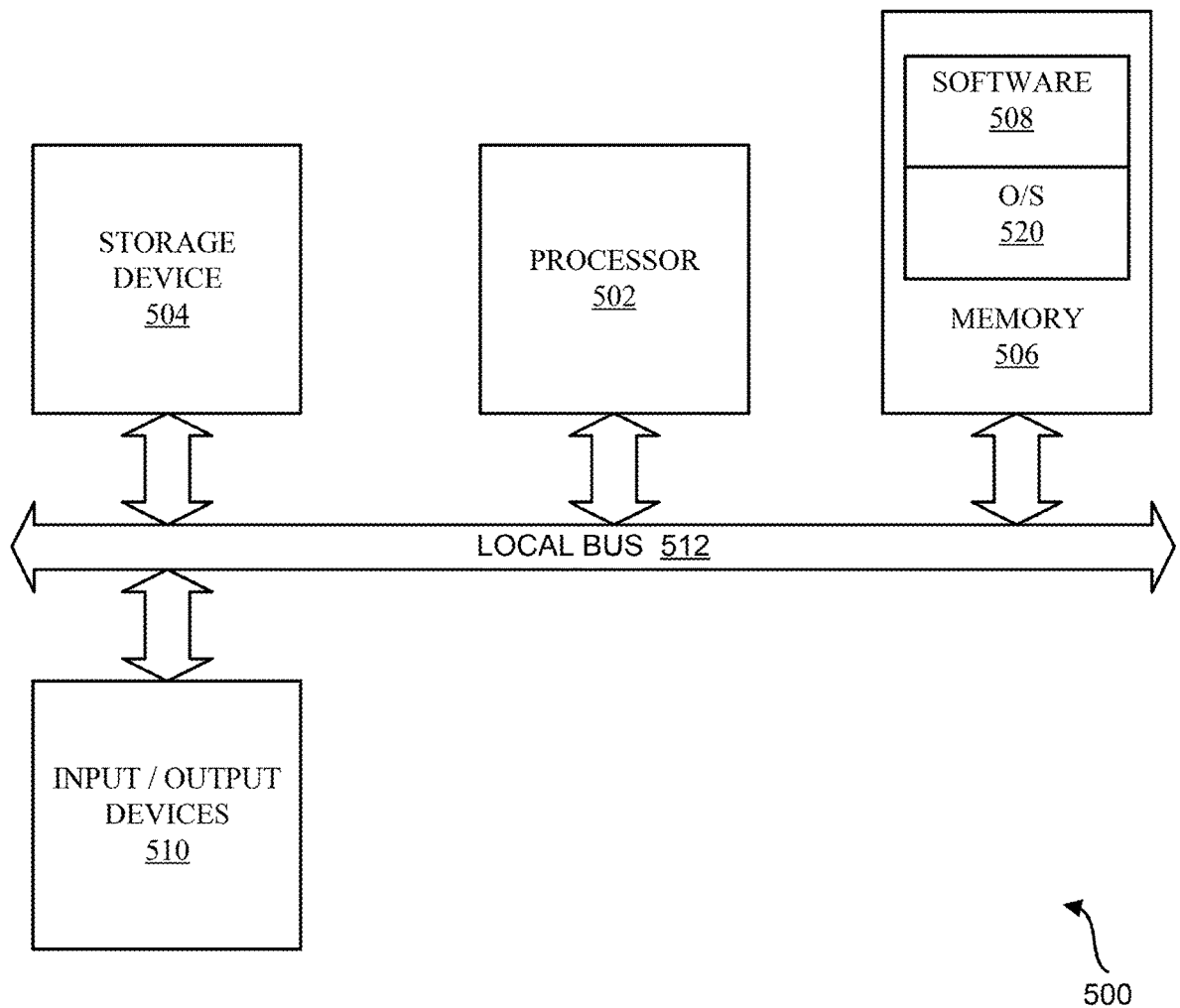
FIG. 5 is a schematic diagram illustrating an example of a system for executing functionality of the present invention.

The present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

While the above description has generally described embodiments where the processing is performed in a single device or system, the methods are also applicable to distributed systems and/or devices. For example, an alternative embodiment may render speech in the cloud and send down rendered audio files to be played back on a local device. For example, one embodiment may provide local voice input and output by rendering TTS locally, while another embodiment may render TTS in the cloud and provide the resulting audio samples to the local device.

It will be apparent to those skilled in the art that various modifications and variations can be made to the structure of the present invention without departing from the scope or spirit of the invention.

What is claimed is:

1. A control interface device configured to produce an output renderable by a speech synthesizer, comprising:
   a processor and a memory configured to store non-transitory instructions for execution by the processor;
   a display unit;
   an input device configured to accept gestures and/or commands to manipulate a graphical object on the display unit,
   wherein, when executed by the processor, the instructions cause the control interface device to perform the steps of:
      receiving a text string and generating phonetic labels describing the text string;
      associating a voice parameter with a portion of the text string at an individual-phoneme level or at an individual-word level of the text string, the voice parameter comprising a markup symbol or text at the individual-phoneme level or at the individual-word level of the text string to provide rendering instructions at the individual-phoneme level or at the individual-word level to the speech synthesizer, the markup symbol or text providing independent control over a plurality of vocal parameters;
      generating duration parameters:
      displaying by the display unit the graphical object comprising a representation of the text string and the voice parameter at the individual-phoneme level or at the individual-word level of the text string, wherein the voice parameter at the individual-phoneme level or at the individual-word level of the text string on the display unit is represented by a visible curve of voice parameter values plotted against frames, and wherein each respective phoneme in the text string is visually associated with particular ones of the frames;
      receiving via the input device a command to modify the voice parameter at the individual-phoneme level or at the individual-word level of the text string; and
      modifying the voice parameter at the individual-phoneme level or at the individual-word level of the text string according to the command.

2. The device of claim 1, wherein the voice parameter comprises a prosody characteristic.

3. The device of claim 1, wherein the voice parameter is bounded by a personality profile consisting of at least one of the group of a vocal tract length, a pitch range, a phrase duration, a pause duration.

4. The device of claim 1, wherein modifying the voice parameter of the audio waveform is in accordance with a parameter range of an audio rendering device configured to render the audio waveform.

5. The device of claim 1, further comprising the step of converting by the processor a gesture detected by the input device into the command.

6. The device of claim 1, further comprising the step of associating a timestamp with the voice parameter.

7. The device of claim 1, wherein the display and the input device comprise a touch screen configured to detect a single touch and/or multi-touch gesture.

8. The device of claim 1, wherein the voice parameter comprises the markup symbol or text added to the text string to provide the rendering instructions to the speech synthesizer.

9. The device of claim 8, wherein the markup symbol or text indicates a value or range for one or more vocal parameters, selected from the group consisting of pitch, duration, amplitude, vocal tract dimension, sibilance, prosody width, and silence.

10. The device of claim 9, wherein the markup symbol or text indicates the voice parameter is to be randomized to prevent repeated utterances from sounding identical, wherein a degree of randomness is specified by specifying a high and low range for the parameter's value.

11. The device of claim 9, wherein the markup symbol indicates the voice parameter is to be randomized to prevent repeated utterances from sounding identical, wherein a degree of randomness is specified by specifying a probability that the parameter adjustment will be applied during a current rendering.

12. The device of claim 1, wherein the graphical object comprises an envelope controller.

13. The device of claim 1 wherein the display is configured to present the text string, the voice parameter, and a second voice parameter as a trajectory.

14. The device of claim 1, wherein the memory stores a plurality of Voice Style Sheet (VSS) parameters formatted in a VSS file, wherein the VSS file comprises a plurality of text strings where each text string is for a respective one of the plurality of VSS parameters that identifies values for an origin, a width, an amplitude, and a sustain for that VSS parameter for rendering text-to-speech.

15. A method for controlling a voice animation for a text-to-speech synthesizer in real-time, comprising the steps of:
   initializing a voice identifier with plurality of Voice Style Sheet (VSS) parameters formatted in a VSS file, wherein the VSS file comprises a plurality of text strings where each text string is for a respective one of the plurality of VSS parameters that identifies values for an origin, a width, an amplitude, and a sustain for that VSS parameter for rendering text-to-speech, each text string having an associated markup symbol or text at the individual-phoneme level or at the individual-word level of the respective text string to provide rendering instructions to the text-to-speech synthesizer, the markup symbol or text providing independent control over a plurality of vocal parameters;
   receiving the plurality of text strings;
   generating a plurality of phonetic labels for a rendering of the plurality of text strings;
   generating duration parameters;
   receiving an input indicating a modification to the plurality of VSS parameters at the individual-phoneme level or at the individual-word level of a particular text string among the plurality of text strings;
   modifying the plurality of VSS parameters according to the modification at the individual-phoneme level or at the individual-word level of the particular text string among the plurality of text strings; and
   generating audio samples according to the plurality of modified VSS parameters.

16. The method of claim 15, wherein the modification refers to a duration of a portion of the voice animation.

17. The method of claim 15, wherein the modification refers to an acoustic feature of a portion of the voice animation.

18. The method of claim 15, further comprising the step of assigning a timestamp to a voice parameter of the plurality of VSS parameters.

19. The method of claim 15, further comprising:
   displaying by a display unit, a graphical object comprising a representation of one of the VSS parameters and its respective text string, wherein the VSS parameter on the display unit is represented by a visible curve of voice parameter values plotted against frames, and wherein each respective phoneme in the respective text string is visually associated with particular ones of the frames.

20. A speech to text system comprising:
   a text and labels module configured to receive a text input and provide a text analysis and a label comprising a phonetic description of the text;
   a label buffer configured to receive the label from the text and labels module;
   a parameter generation module configured to access the label from the label buffer, generate a duration parameter, and generate a speech generation parameter;
   a parameter buffer configured to receive the parameter from the parameter generation module;
   an audio generation module configured to receive the text input, the label, and/or the parameter and generate a plurality of audio samples; and
   a scheduler configured to monitor and schedule at least one of the group consisting of the text and label module, the parameter generation module, and the audio generation module;
   wherein the parameter generation module is further configured to perform the steps of:
      initializing a voice identifier with a Voice Style Sheet (VSS) parameter formatted in a VSS file, wherein the VSS file comprises a plurality of text strings where each text string is for a respective one of the plurality of VSS parameters that identifies values for an origin, a width, an amplitude, and a sustain for that VSS parameter for rendering text-to-speech, each text string having an associated markup symbol or text at the individual-phoneme level or at the individual-word level of the respective text string to provide rendering instructions to a speech synthesizer, the markup symbol or text providing independent control over a plurality of vocal parameters;
      receiving an input indicating a modification to the VSS parameter at the individual-phoneme level or at the individual-word level of a particular text string among the plurality of text strings; and
      modifying the VSS parameter according to the modification at the individual-phoneme level or at the individual-word level of the particular text string among the plurality of text strings.

21. The system of claim 20, further comprising a control interface configured to display the display voice animation control data and provide an interface to receive real-time input to manipulate the animation control data.

22. The system of claim 20, wherein the audio generation module further comprises a text-to-speech (TTS) playback device configured to receive input comprising text and formatted control data for rendering by an audio transducer in real-time.

23. The device of claim 22, wherein the audio generation module further comprises an audio transducer.

24. The system of claim 20, wherein the plurality of audio samples comprises a speech synthesis of the text input.

25. The device of claim 20, further comprising a sample buffer configured to receive the plurality of samples from the audio generation module.

26. The system of claim 20, further comprising:
   a display unit configured to display a graphical object comprising a representation of one of the plurality of VSS parameters and its respective text string, wherein the VSS parameter on the display unit is represented by a visible curve of the VSS parameter's values plotted against frames, and wherein each respective phoneme in the respective text string is visually associated with particular ones of the frames.

27. A computer-implemented method of statistical parametric speech synthesis, the method comprising:
   analyzing a text string with a text analyzer to produce phonetic labels lexically and phonetically describing the text string;
   using the phonetic labels to access context dependent models for acoustic features and duration
   generating parameters from the context dependent models for all of the phonetic labels, including duration parameters;
   translating controls to a voice style sheet format identifying parameters including pitch (f0) spectrum, duration, vocal tract length, and aperiodicity per frame for all the phonetic labels, wherein one of the parameters is associated with a portion of the text string at an individual-phoneme level or at an individual-word level of the text string, the parameter comprising a markup symbol or text at the individual-phoneme level or at the individual-word level of the text string to provide rendering instructions at the individual-phoneme level or at the individual-word level to a rendering system, the markup symbol or text providing independent control over a plurality of vocal parameters;

providing a control interface for real-time manipulation of the parameters, including manipulation, at the individual-phoneme level or at the individual-word level of the text string, of the parameter associated the portion of the text string at the individual-phoneme level or at the individual-word level of the text string;

synthesizing a set of audio samples with a vocoder based on the parameters, the markup symbol or text, and the real-time manipulation of the parameters at the control interface to produce a synthesized speech waveform of the text string; and rendering the synthesized speech with the rendering system.

* * * * *